US009911088B2

(12) United States Patent
Nath et al.

(10) Patent No.: US 9,911,088 B2
(45) Date of Patent: Mar. 6, 2018

(54) OPTIMIZING TASK RECOMMENDATIONS IN CONTEXT-AWARE MOBILE CROWDSOURCING

(71) Applicant: Microsoft Corporation, Redmond, WA (US)

(72) Inventors: Suman Nath, Redmond, WA (US); Michel Goraczko, Seattle, WA (US); Jie Liu, Medina, WA (US); Azalia Mirhoseini, Houston, TX (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 791 days.

(21) Appl. No.: 14/267,608

(22) Filed: May 1, 2014

(65) Prior Publication Data
US 2015/0317582 A1    Nov. 5, 2015

(51) Int. Cl.
*G06Q 10/00* (2012.01)
*G06Q 10/06* (2012.01)
*G06Q 10/10* (2012.01)

(52) U.S. Cl.
CPC ....... *G06Q 10/06* (2013.01); *G06Q 10/06311* (2013.01); *G06Q 10/06316* (2013.01); *G06Q 10/1097* (2013.01)

(58) Field of Classification Search
CPC ....... G06Q 10/06311; G06Q 10/06316; G06Q 10/1097
(Continued)

(56) References Cited

U.S. PATENT DOCUMENTS

| 8,472,980 B2 | 6/2013 | Khorashadi et al. |
| 2009/0204470 A1 * | 8/2009 | Weyl ............... G06Q 10/06 705/7.13 |

(Continued)

OTHER PUBLICATIONS

Cardone, et al., "Fostering ParticipAction in Smart Cities: A Geo-Social Crowdsensing Platform", In IEEE Communications Magazine, vol. 51, Issue 6, Jun. 2013, 8 pages.
(Continued)

*Primary Examiner* — Sujay Koneru
(74) *Attorney, Agent, or Firm* — Lyon & Harr, LLP; Mark A. Watson

(57) ABSTRACT

A "Context-Aware Crowdsourced Task Optimizer" provides various processes to optimize task recommendations for workers in mobile crowdsourcing scenarios by automatically identifying and recommending bundles of tasks compatible with workers' contexts (e.g., worker history, present or expected locations, travel paths, working hours, skill sets, capabilities of worker's mobile computing devices, etc.). The Context-Aware Crowdsourced Task Optimizer bundles tasks to both maximize expected numbers of completed tasks and to dynamically price tasks to maximize the system's utility, which is a function of task values and task completion rates. Advantageously, the resulting task identification and recommendation process incentivizes individual workers to perform more tasks in a shorter time period, thereby helping tasks to complete faster, even with smaller budgets. While such optimization problems are NP-hard, the Context-Aware Crowdsourced Task Optimizer exploits monotonicity and submodularity of various objective functions to provide computationally feasible task identification and recommendation algorithms with tight optimality bounds.

20 Claims, 4 Drawing Sheets

(58) Field of Classification Search
USPC .................................. 705/7.13, 7.21, 7.26
See application file for complete search history.

(56) References Cited

U.S. PATENT DOCUMENTS

| | | | |
|---|---|---|---|
| 2012/0088220 A1 | 4/2012 | Feng et al. | |
| 2013/0084891 A1* | 4/2013 | Khorashadi | G01S 5/0252 455/456.3 |
| 2013/0090981 A1 | 4/2013 | Shankaranarayanan et al. | |
| 2013/0253969 A1 | 9/2013 | Das et al. | |
| 2014/0156325 A1* | 6/2014 | Stewart | G06Q 10/06311 705/7.13 |
| 2014/0214467 A1* | 7/2014 | Asur | G06Q 10/063112 705/7.14 |
| 2015/0302340 A1* | 10/2015 | Dasgupta | G06Q 10/063114 705/7.15 |

OTHER PUBLICATIONS

"Mobile Crowdsourcing at Clickworker", Published on: Sep. 3, 2013, Available at: http://www.clickworker.com/en/2013/09/03/mobiles-crowdsourcing-mit-clickworker-com/.

Alt, et al., "Location-Based Crowdsourcing: Extending Crowdsourcing to the Real World", In Proceedings of the 6th Nordic Conference on Human-Computer Interaction: Extending Boundaries, Oct. 16, 2010, 10 pages.

Korthaus, et al., "Crowdsourcing in Heterogeneous Networked Environments—Opportunities and Challenges", In Proceedings of 15th International Conference on Network-Based Information Systems, Sep. 26, 2012, 6 pages.

Deng, et al., "Maximizing the number of worker's self-selected tasks in spatial crowdsourcing." In ACM GIS (2013).

Freitas, J., Calado, A., Braga, D., Silva, P., and Dias, M. Crowdsourcing platform for large-scale speech data collection. Proc. FALA, Vigo (2010).

Jaimes, L. G., Vergara-Laurens, I., and Labrador, M. A. A location-based incentive mechanism for participatory sensing systems with budget constraints. In Pervasive Computing and Communications (PerCom), 2012 IEEE International Conference on (2012).

Kamar, et al., "Lifelong Learning for Acquiring the Wisdom of the Crowd", In Proceedings of the Twenty-Third International Joint Conference on Artificial Intelligence, Aug. 3, 2013, 8 pages.

Kamar, E., Horvitz, E., and Meek, C. Mobile opportunistic commerce: mechanisms, architecture, and application. In Proceedings of the 7th international joint conference on Autonomous agents and multiagent systems—vol. 2, International Foundation for Autonomous Agents and Multiagent Systems (2008).

Kazemi, L., Shahabi, C., and Chen, L. Geotrucrowd: Trustworthy query answering with spatial crowdsourcing. In ACM GIS (2013).

Kokkalis, N., Huebner, J., Diamond, S., Becker, D., Chang, M., Lee, M., Schulze, F., Koehn, T., and Klemmer, S. R. Automatically providing action plans helps people complete tasks. In AAAI Workshops (2012).

Lee, J.-S., and Hoh, B. Dynamic pricing incentive for participatory sensing. Pervasive and Mobile Computing 6, 6 (2010), 693-708.

Lehmann, B., Lehmann, D., and Nisan, N. Combinatorial auctions with decreasing marginal utilities. In Proceedings of the 3rd ACM Conference on Electronic Commerce, EC '01 (2001), 18-28.

Mednis, A., Strazdins, G., Zviedris, R., Kanonirs, G., and Selavo, L. Real time pothole detection using android smartphones with accelerometers. In International Conference on Distributed Computing in Sensor Systems and Workshops (DCOSS), IEEE (2011).

Mohan, P., Padmanabhan, V. N., and Ramjee, R. Nericell: rich monitoring of road and traffic conditions using mobile smartphones. In ACM SenSys (2008).

Mun, M., Reddy, S., Shilton, K., Yau, N., Burke, J., Estrin, D., Hansen, M., Howard, E., West, R., and Boda, P. PEIR: the personal environmental impact report, as a platform for participatory sensing systems research. In ACM MobiSys (2009).

Musthag, M., and Ganesan, D. The role of super agents in mobile crowdsourcing. In Workshops at the Twenty-Sixth AAAI Conference on Artificial Intelligence (2012).

Musthag, et al., "Labor Dynamics in a Mobile Micro-Task Market", In Proceedings of the SIGCHI Conference on Human Factors in Computing Systems, Apr. 27, 2013, 10 pages.

Rana, R. K., Chou, C. T., Kanhere, S. S., Bulusu, N., and Hu, W. Ear-phone: an end-to-end participatory urban noise mapping system. In ACM/IEEE IPSN, ACM (2010).

Stevens, M., and D'Hondt, E. Crowdsourcing of pollution data using smartphones. In Workshop on Ubiquitous Crowdsourcing (2010).

Tamilin, A., Carreras, I., Ssebaggala, E., Opira, A., and Conci, N. Context-aware mobile crowdsourcing. In UbiComp (2012).

Thiagarajan, A., Ravindranath, L., LaCurts, K., Madden, S., Balakrishnan, H., Toledo, S., and Eriksson, J. Vtrack: accurate, energy-aware road traffic delay estimation using mobile phones. In ACM SenSys (2009).

Vondrak, J. Optimal approximation for the submodular welfare problem in the value oracle model. In Proceedings of the 40th annual ACM symposium on Theory of computing (STOC) (2008).

Yan, T., Marzilli, M., Holmes, R., Ganesan, D., and Corner, M. mcrowd: a platform for mobile crowdsourcing. In Proceedings of the 7th ACM Conference on Embedded Networked Sensor Systems (2009).

Yang, et al., "Crowdsourcing to Smartphones: Incentive Mechanism Design for Mobile Phone Sensing", In Proceedings of the 18th Annual International Conference on Mobile Computing and Networking, Aug. 22, 2012, 12 pages.

* cited by examiner

OPTIMIZING TASK RECOMMENDATIONS IN CONTEXT-AWARE MOBILE CROWDSOURCING

BACKGROUND

Advances in smart phone technologies along with their ever-increasing popularity have led to development of mobile crowdsourcing markets where workers are paid to perform various tasks. Mobile crowdsourcing differs from traditional crowdsourcing in that workers often need to be at specific contexts (such as location, transportation mode, surroundings, etc.) to perform assigned tasks using their smart phones or other mobile computing devices. Typical tasks pay workers a few dollars for capturing photos of buildings or places, checking price and placement of a product in stores, checking traffic, taking location-aware surveys, etc. Other location-based task examples include, but are not limited to detecting potholes, mapping noise and pollution in urban areas, monitoring road traffic, collecting speech samples, measuring personal environmental impact, etc.

Conventional mobile crowdsourcing schemes often provide generic platforms to enable various crowdsourcing tasks. Some of these platforms use various algorithms in an effort to improve task completion rates. For example, a common approach is to use various incentive-based mechanisms in an attempt to motivate workers to complete their tasks. Other approaches use reverse auction-based dynamic pricing algorithms, where mobile workers bid lower amounts for task completion to reduce the incentive cost compared with fixed task prices when assigning tasks to workers. A related approach uses a greedy algorithm based on a recurrent reverse auction incentive mechanism in an attempt to maximize a covered area under a budget constraint.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Context-Aware Crowdsourced Task Optimizer," as described herein, provides various processes for optimizing paid task recommendations for workers in mobile crowdsourcing scenarios by automatically identifying and recommending bundles of multiple tasks compatible with workers' contexts (e.g., worker history, present or expected worker locations, travel paths, working hours, skill set, capabilities of worker's mobile computing devices, etc.). The Context-Aware Crowdsourced Task Optimizer bundles multiple tasks for recommendation to individual workers to both maximize an expected number of completed tasks and to dynamically price tasks to maximize an overall utility that is a function of both task values and task completion rates. Advantageously, the resulting task identification and recommendation process has been observed to incentivize individual workers to perform more tasks in a shorter time period, thereby helping tasks to complete faster, even with smaller budgets.

In contrast to conventional crowdsourced task assignment processes, the Context-Aware Crowdsourced Task Optimizer learns workers' desired incentive for different tasks and exploits this information in combination with worker context information and task completion histories to optimize the task bundling and recommendation process in combination with task pricing relative to particular workers. The Context-Aware Crowdsourced Task Optimizer's optimization algorithms differ from existing crowdsourced task assignment processes with respect to the optimization intent, bundling of multiple tasks with respect to particular workers, and the ability to consider worker context in general, rather than being specific to particular locations.

In view of the above summary, it is clear that the Context-Aware Crowdsourced Task Optimizer described herein provides various processes for bundling and recommending paid tasks for particular workers in mobile crowdsourcing scenarios in a way that both optimizes task completion rates and reduces task costs. In addition to the just described benefits, other advantages of the Context-Aware Crowdsourced Task Optimizer will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
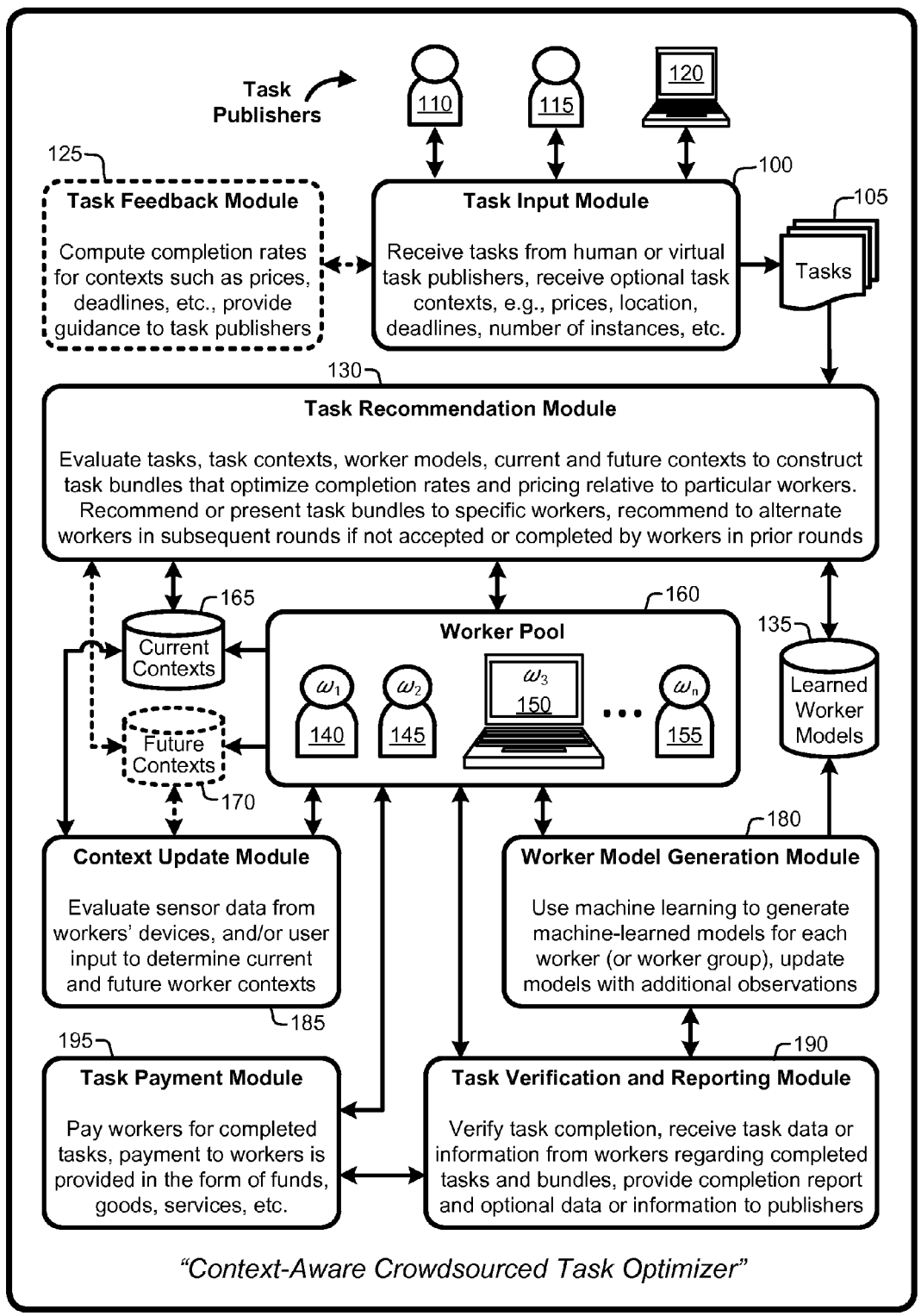
FIG. 1 provides an exemplary architectural flow diagram that illustrates program modules for bundling and recommending paid tasks to particular workers in mobile crowdsourcing scenarios using a "Context-Aware Crowdsourced Task Optimizer," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Context-Aware Crowdsourced Task Optimizer," as described herein, optimizes recommendations to particular workers for paid (or voluntary) tasks in mobile crowdsourcing scenarios. These recommendations use any of a variety of machine-learning processes to learn statistical or probabilistic worker models that are then used by an optimization process that automatically identifies and recommends bundles of multiple tasks that are compatible with workers' present and future contexts. Examples of present and future worker contexts includes, but are not limited to, worker history, present or expected worker locations, travel paths, working hours, skill set, capabilities of worker's fixed and mobile computing devices, etc. Note that tasks are created, published, or otherwise provided to the Context-Aware Crowdsourced Task Optimizer by "task publishers" that can be human or virtual. Consequently, in various embodiments, the Context-Aware Crowdsourced Task Optimizer operates as an automated intermediary between task publishers and workers.

In other words, instead of allowing the workers to choose any task they want, the Context-Aware Crowdsourced Task Optimizer uses machine learning to train predictive models that are used to determine which workers are most likely to complete particular tasks (or bundles of two or more tasks) successfully, and then to assign or recommend tasks and task bundles to workers most likely to complete those tasks. The machine learning techniques consider each workers history and behavior with respect to task types, task completion rates, contexts such as locations, travel direction, schedule, capabilities or skills of each worker (e.g., professional photographer, foreign language skills, etc.), capabilities of the workers mobile computing devices or tools (e.g., high resolution still or video cameras, laser rangefinders, microphones, etc.).

Note for purposes of explanation, workers are generally discussed throughout this document in the context of human workers that accept and perform tasks and task bundles that are recommended by the Context-Aware Crowdsourced Task Optimizer. However, it should be understood that the processes enabled by the Context-Aware Crowdsourced Task Optimizer apply to both human and virtual workers. Examples of virtual workers include, but are not limited to, computers and applications or tasks running on those computers (including both fixed and mobile computing devices), robots, drones, driverless taxis, etc. As such, the discussion of "workers" in the following discussion should be understood to apply to both real and virtual workers. It should also be understood that any examples of using the Context-Aware Crowdsourced Task Optimizer to interact with specific types of human or virtual workers is not intended to limit the use of the Context-Aware Crowdsourced Task Optimizer to the particular worker type described.

Further, it should also be understood that groups of human and/or virtual workers can also be "bundled" by the Context-Aware Crowdsourced Task Optimizer such that multiple workers can cooperate to perform particular tasks or task bundles. In the case of multiple workers acting as a group, the Context-Aware Crowdsourced Task Optimizer can learn a predictive worker model across the group as a whole, thereby effectively treating a group of multiple workers as a single "super worker" or the like. As such, recommending tasks to particular groups of workers is treated in the same way as recommending tasks to individual workers, with the primary difference being that the group entity will inherently have increased capacity to complete more tasks than individual workers.

Advantageously, the task identification and recommendation process provided by the Context-Aware Crowdsourced Task Optimizer has been observed to incentivize individual workers to perform more tasks in a shorter time period, thereby helping tasks to complete faster, even with smaller budgets. For example, in tested embodiments with real tasks and workers, the Context-Aware Crowdsourced Task Optimizer was observed to increase task completion rates by a factor of approximately 2 relative to conventional task assignment schemes under the same task budget (i.e., the amount that workers are paid upon task completion), and by a factor of approximately 1.5 relative to conventional task assignment schemes when reducing the task budget to approximately half of the original budget.

Advantageously, the Context-Aware Crowdsourced Task Optimizer bundles multiple tasks for recommendation to individual workers in a way that both maximizes an expected number of completed tasks and that dynamically prices tasks to maximize an overall system utility. Note that in various embodiments, this system utility is modelled as a function of both task values and task completion rates. Although such optimization problems are typically considered to be NP-hard (e.g., very large numbers of possible combinations of tasks, task bundles, assignment or recommendation of tasks and task bundles to particular workers, task pricing, etc.), the Context-Aware Crowdsourced Task Optimizer successfully addresses the optimization problem by exploiting monotonicity and submodularity of various objective functions to provide computationally feasible task identification and recommendation algorithms with tight optimality bounds.

Advantageously the Context-Aware Crowdsourced Task Optimizer can use any of a large number of optimization algorithms or processes to solve this optimization problem, e.g., greedy algorithms, expectation-maximization algorithms, etc. For example, as is well known to those skilled in the art, in mathematical optimization, constrained optimization is the process of optimizing an objective function with respect to some number of variables in the presence of constraints on those variables. Such objective functions are often considered as either a cost function or an energy function which is to be minimized, or a reward function or utility function which is to be maximized. Constraints are generally either hard constraints which set conditions that are to be satisfied for particular variables, or soft constraints which are used to penalize or weight variables in the objective function when corresponding conditions on the variables are not satisfied. Some of the constraints considered by the Context-Aware Crowdsourced Task Optimizer include, but are not limited to, available workers, present and future contexts of those available workers, available tasks, payment or rewards associated with tasks or task bundles, task completion rates, tasks prices or costs, task deadlines, etc.

In general, the following discussion describes various "greedy" constraint-based optimization processes for optimizing the recommendation and bundling of tasks to particular workers. However, there are a very large number of well-known constrained optimization processes that can be adapted for use by the Context-Aware Crowdsourced Task Optimizer. As such, it should be understood that the Context-Aware Crowdsourced Task Optimizer is not intended to be limited to the use of greedy optimization processes such as those described herein for purposes of explanation.

1.1 System Overview:

As noted above, the "Context-Aware Crowdsourced Task Optimizer," provides various processes for bundling and recommending paid tasks for particular workers in mobile crowdsourcing scenarios in a way that both optimizes task completion rates and reduces task costs. The processes summarized above are illustrated by the general system diagram of FIG. 1. In particular, the system diagram of FIG. 1 illustrates the interrelationships between program modules for implementing various embodiments of the Context-Aware Crowdsourced Task Optimizer, as described herein. Furthermore, while the system diagram of FIG. 1 illustrates a high-level view of various embodiments of the Context-Aware Crowdsourced Task Optimizer, FIG. 1 is not intended to provide an exhaustive or complete illustration of every possible embodiment of the Context-Aware Crowdsourced Task Optimizer as described throughout this document.

In addition, it should be noted that any boxes and interconnections between boxes that may be represented by broken or dashed lines in FIG. 1 represent alternate embodiments of the Context-Aware Crowdsourced Task Optimizer described herein, and that any or all of these alternate embodiments, as described below, may be used in combination with other alternate embodiments that are described throughout this document.

In general, as illustrated by FIG. 1, the processes enabled by the Context-Aware Crowdsourced Task Optimizer begin operation by using a task input module 100 to receive one or more tasks 105 from human or virtual task publishers (110, 115, 120). In addition, the task input module 100 also receives one or more optional task contexts, e.g., prices, location, deadlines, number of instances, etc.

In various embodiments, a task feedback module 125 compute completion rates for various contexts such as prices, deadlines, etc., and uses these completion rates to provide guidance to task publishers (110, 115, 120) for specifying various task contexts prior to publishing those tasks 105. Note that the concept of providing task context feedback to assist the task publishers in specifying or otherwise setting those contexts is discussed in further detail in Section 2.7 of this document.

Once one or more tasks 105 have been received from any of the task publishers (110, 115, 120), a task recommendation module 130 evaluates those tasks, any associated task contexts, learned worker models 135 for one or more human or virtual workers (140, 145, 150, 155) in a worker pool 160, and current and future worker contexts (165 and 170, respectively) to construct task bundles that optimize completion rates and pricing relative to one or more particular workers in the worker pool. The task recommendation module 130 then recommends or presents those task bundles to specific workers. In the case that workers receiving task or task bundle recommendations do not accept the recommended tasks within some period time (e.g., a task acceptance round), the task recommendation module will then recommend some or all of those tasks to alternate workers in subsequent rounds. Similarly, if accepted tasks are not completed by workers within some predefined period of time, those tasks will be withdrawn from the accepting worker and offered or recommended to alternate workers for completion.

In general, the aforementioned learned worker models 135 are generated by a worker model generation module 180 that uses any of a wide variety of machine learning techniques to generate machine-learned models for each worker (or worker group). The worker model generation module 180 also update the learned worker models 135 over time when additional observations (e.g., task completions, worker history, etc.) become available.

As noted above, when recommending tasks and task bundles, the Context-Aware Crowdsourced Task Optimizer also considers the current context 165 of each worker (e.g., weekday travel routes, weekend travel, free time, available computing devices, tools, skill set, etc.) and optional future context 170 of each worker. Note the future context 170 can be determined from a number of factors, such as, for example, predicted availability based on other accepted tasks, electronic calendar, expected travel routes, etc. A context update module 185 is used to evaluate sensor data from workers' devices, and/or user input to determine and update the current and future worker contexts (165 and 170, respectively) whenever additional worker context information becomes available.

A task verification and reporting module 190 is used to verify task 105 completions. Note that this verification may also include receiving task data (e.g., picture of a restaurant menu) or information (e.g., traffic observations at a particular intersection) from workers regarding completed tasks and task bundles. The task verification and reporting module 190 then provides a completion report and any optional or associated data or information to the corresponding task publisher (110, 115, or 120).

Finally, once the task verification and reporting module 190 has verified task completion, a task payment module 195 pays the workers (110, 115, 130) for completed tasks 105. Note that payment to workers is provided in the form of funds, goods, services, etc. Further, payment can be provided in parts, or as a percentage of the total work, as each task is completed. Further, a bonus may be provided upon completion of an entire bundle, or completion of particular tasks or bundles prior to some deadline. Alternately, payment can be withheld until an entire bundle is completed. Clearly, payment to compensate workers for completed tasks can be made in any way desired without departing from the intended scope of the ideas discussed herein.

2.0 Operation of the Context-Aware Crowdsourced Task Optimizer:

The above-described program modules are employed for implementing various embodiments of the Context-Aware Crowdsourced Task Optimizer. As summarized above, the Context-Aware Crowdsourced Task Optimizer provides various processes for bundling and recommending paid tasks for particular workers in mobile crowdsourcing scenarios in a way that both optimizes task completion rates and reduces task costs. The following sections provide a detailed discussion of the operation of various embodiments of the Context-Aware Crowdsourced Task Optimizer, and of exemplary methods for implementing the program modules described in Section 1 with respect to FIG. 1. In particular, the following sections provides examples and operational details of various embodiments of the Context-Aware Crowdsourced Task Optimizer, including:

An operational overview of the Context-Aware Crowdsourced Task Optimizer;
An exmplary general system model of the Context-Aware Crowdsourced Task Optimizer;
Machine-learned worker models;
Task bundling;
Maximizing utility with adaptive pricing;
Supporting arbitrary task contexts; and
Context feedback to task publishers.

2.1 Operational Overview:

As noted above, the Context-Aware Crowdsourced Task Optimizer-based processes described herein provide various processes for bundling and recommending paid or voluntary tasks for particular workers in mobile crowdsourcing scenarios in a way that both optimizes task completion rates and reduces task costs. In other words, the Context-Aware Crowdsourced Task Optimizer provides personalized task recommendations to individual workers (or to specific groups of workers) based on their current context and their predicted future contexts, as well any optional personal preferences towards different types of tasks. In various embodiments, these personal preferences are optionally specified by the worker and/or automatically learned by the Context-Aware Crowdsourced Task Optimizer by observing factors including, but not limited to, worker acceptance of particular types of tasks, acceptance of tasks at particular price points, task completions over time, etc.

In general a worker's current context is inferred or determined from sensors associated with one or more of the worker's mobile computing devices (e.g., GPS, accelerometers, Wi-Fi, etc.), while his future contexts and preferences are dynamically learned from historical data such as frequently visited places, transportation modes (e.g., walking, bicycling, driving, train travel, air travel, etc.), travel routes, completed tasks, preferred times, etc. Exploiting a worker's current and future contexts enables the Context-Aware Crowdsourced Task Optimizer to recommend tasks to suitable workers. For example, a traffic monitoring or reporting task can be recommended to workers walking or driving at, near, or towards a target location, while a speech data collection task can be recommended to workers at quiet locations, noisy locations, locations where particular groups of people are speaking or where particular languages are being spoken, etc., depending on any task requirements or constraints specified by the task publisher.

Further, by exploiting future contexts, the Context-Aware Crowdsourced Task Optimizer can take into account the information about workers that are currently unavailable but that are expected to be available at some arbitrary point in the future or that are expected to be available in time to complete a task or task bundle prior to an optional task deadline. Such considerations enable the Context-Aware Crowdsourced Task Optimizer to consider a holistic view of the available worker pool in order to perform optimization of task recommendations to particular workers to increase task completion rates while concurrently optimizing or setting task prices to reduce expenses.

In addition, by exploiting information regarding workers' specified or learned preferences towards task types, payments, travel distance, etc., the Context-Aware Crowdsourced Task Optimizer can recommend tasks to workers who are likely to perform them.

Figure 2:
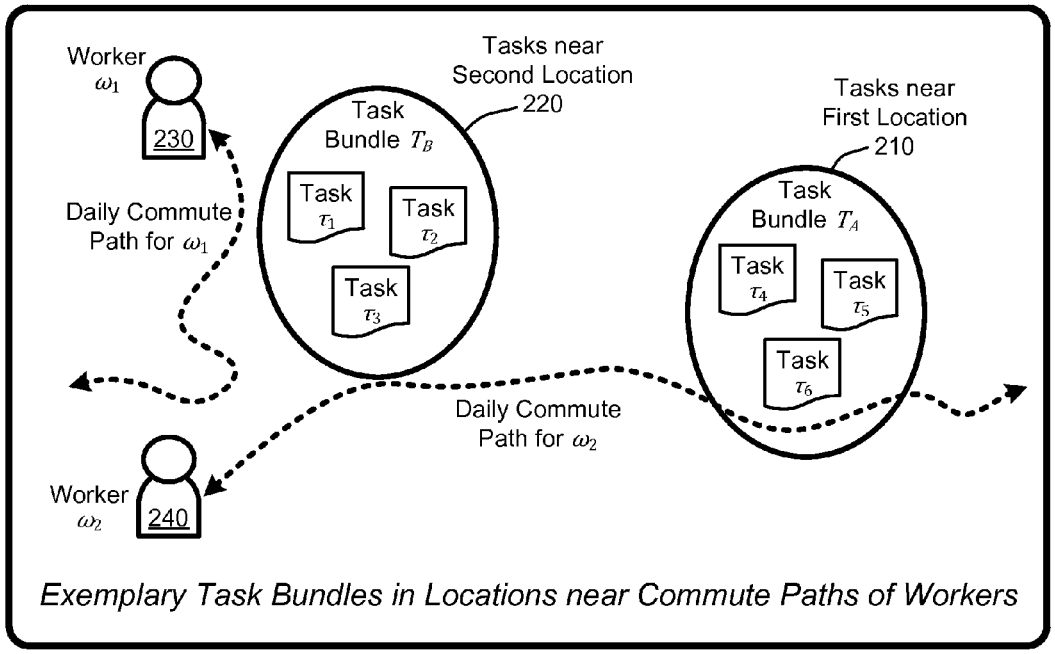
FIG. 2 illustrates exemplary task bundles in locations near commute paths of workers, as described herein.

For example, consider FIG. 2, which shows two workers $\omega_1$ (230) and $\omega_2$ (240) and their corresponding daily commute paths (shown by dashed lines) relative to tasks near a first location 210 and to tasks near a second location 220. In this example, worker $\omega_2$ (240) can perform tasks from either task bundle $T_A$ (i.e., tasks $\tau_4$, $\tau_5$, and $\tau_6$, near the first location 210) or task bundle $T_B$ (i.e., tasks $\tau_1$, $\tau_2$, and $\tau_3$, near the second location 220) at a low travel overhead (i.e., traveling short distance from her typical daily commute path). However, in this example, worker $\omega_2$ 240 may or may not be able to perform the tasks in both task bundles prior to some task deadline associated with one or more of the tasks or. On the other hand, worker $\omega_1$ (230) would incur a relatively higher travel overhead (i.e., traveling a longer distance from his typical daily commute path) to perform the tasks in task bundle $T_A$ but a small travel overhead to perform the tasks in task bundle $T_B$. Given prior knowledge from these two workers, including their daily commute routes, capability to perform multiple tasks, etc., the Context-Aware Crowdsourced Task Optimizer will recommend task bundle $T_A$ to worker $\omega_2$ (240) and task bundle $T_B$ to worker $\omega_1$ (230).

With respect to task bundling, the Context-Aware Crowdsourced Task Optimizer also considers the efficiency of particular. For example, some workers tend to optimize their efficiency by carefully planning their trips, and manually attempting to select and bundle a sequence or set of tasks to perform in a single trip. This manual selection and bundling of tasks by individual workers helps those workers to amortize their total trip cost (e.g., travel cost, time, etc.) over multiple tasks. In contrast, less efficient workers tend not to strategize as carefully and therefore have lower efficiency across the board. Unfortunately, manual planning and task bundling by workers does not enable particular tasks to be automatically recommended to particular workers, and also consumes a considerable amount of the workers time.

Advantageously, the Context-Aware Crowdsourced Task Optimizer exploits the above observations to further enhance task completion rates. For example, rather than simply listing all available tasks for all workers (or some subset of workers) to choose from, the Context-Aware Crowdsourced Task Optimizer automatically identifies bundles of tasks suitable for one or more particular workers (in view of the available or expected pool of other workers), and then provides recommendations to particular workers about these bundles. In other words, not all workers will receive recommendations for particular task bundles, and not all bundles will include the same tasks.

Advantageously, recommending task bundles for particular workers saves workers' time by eliminating the need for workers to manually browse through large collections of available tasks to find and accept one or more suitable tasks. Bundling tasks also offers a number of advantages. For example, the automatic bundling provided by the Context-Aware Crowdsourced Task Optimizer has been observed to improve workers' efficiency in terms of earnings per unit efforts (e.g., miles traveled, time to travel to task location, etc.), especially for workers that are less likely to manually identify the opportunity of bundling tasks by themselves. This automatic bundling also results in faster and higher task completion rates, which are typically desirable outcomes for the task publisher. In addition, task publishers are often able to have their tasks performed with smaller budgets as long as the aggregate revenue of a bundle remains more attractive to one or more workers than the incentive for a single task. Further, this automatic bundling enables the Context-Aware Crowdsourced Task Optimizer to add otherwise unprofitable tasks into the same bundle as profitable ones, thereby avoiding a scenario where workers greedily choose only profitable tasks, while leaving unprofitable tasks unassigned and uncompleted.

For example, referring back to FIG. 2, the idea of bundling tasks can be illustrated by assuming that worker $\omega_2$ (240) accepts a recommendation of task bundle $T_A$ presented by the Context-Aware Crowdsourced Task Optimizer. Assume that in this example, to do task $\tau_4$, worker $\omega_2$ (240) demands extra payment to cover the trip overhead (e.g., cost of gas, time, etc.) of detouring to go the task location. However, once the worker is at task $\tau_4$'s location, he might as well do tasks $\tau_5$ and $\tau_6$ that are located nearby, without any significant trip overhead. Consequently, by bundling the tasks together and recommending bundle $T_A$ to the worker, the Context-Aware Crowdsourced Task Optimizer can increase the completion rate of all the three tasks in this bundle, possibly with a dynamically adjusted price that is smaller than the sum of all individual task payments.

In other words, suppose a new task received from a task publisher, and that the Context-Aware Crowdsourced Task Optimizer knows how complicated the task is, what the payment for the task is, how far the task is from particular workers or the expected travel routes of those workers. Given such information, the Context-Aware Crowdsourced Task Optimizer will evaluate the learned worker models to return a probabilistic likelihood that particular workers will perform the particular task or bundle (optionally within some period of time). However, given a potentially very large worker pool, it is likely that multiple workers will be identified as having relatively high probabilities of completing particular tasks or task bundles. So, the question becomes which workers will receive the recommendation where they have the same or similar probability of completing the task or task bundle. As noted above, the recommendation question is answered by assigning or recommending tasks in a way that optimizes the task completion rates over all (or most tasks).

Advantageously, in various embodiments, the Context-Aware Crowdsourced Task Optimizer operates proactively in the background given a set of tasks and a set of potential workers. Further, the Context-Aware Crowdsourced Task Optimizer can leverage push notifications to remind workers of available task bundles that meet their contexts (e.g., a particular worker is notified of a recommended task bundle when she is observed to be near the location of those tasks). Such proactive recommendations or push notifications can also consider electronic calendars of workers.

For example, if the calendar of a worker shows that she has an all-day meeting scheduled when she is near a location associated with one or more tasks, the Context-Aware Crowdsourced Task Optimizer can consider her calendar and thus recommend the task bundle to another worker who might not be as close or even as capable. In other words, as discussed throughout this document, the Context-Aware Crowdsourced Task Optimizer provides recommendations that consider a wide variety of contextual considerations for particular workers and use those contextual considerations to optimize various factors including, but not limited to, task completion rates, task completion times, task costs, etc.

Another example of actively notifying workers is that in various embodiments, the Context-Aware Crowdsourced Task Optimizer pushes recommendations of tasks to workers that are near tasks that can be accepted, or to remind the worker to complete tasks depending upon time or current location of worker. In other words, when the worker is near (or heading towards) a task location, the system can remind the worker to perform a previously assigned task. For example, the Context-Aware Crowdsourced Task Optimizer can alert the worker or send a message to a computing device (e.g., a cell phone) of the worker, such as, for example, "Based on your typical daily commute (or current travel route), you will be passing near Restaurant X. If you stop in and take a picture of the menu we will pay you a $5 for completion of that task." In other words, the Context-Aware Crowdsourced Task Optimizer tries to learn known present locations, travel routes, anticipated future locations, etc., for workers, and then to use this and other information to recommend bundles of one or more tasks to the workers based on the location of those tasks relative to the location of the worker.

2.2 General System Model:

Context-Aware Crowdsourced Task Optimizer receives inputs including historical, real-time and future context information of multiple workers, and task properties (such as location, payment, deadline, etc.) from one or more task publishers. Given these inputs, the Context-Aware Crowdsourced Task Optimizer outputs recommended assignments of bundles of tasks to active workers. In making these recommendations, the Context-Aware Crowdsourced Task Optimizer uses learned worker models to make recommendations in a way that meets various criteria, including maximizing task completion rates where task payments are fixed, jointly maximizing task completion rates while minimizing task payments using adaptive pricing, etc.

The Context-Aware Crowdsourced Task Optimizer generally assumes a paid mobile crowdsourcing platform where workers are paid (in money, goods, or services) upon task completion. However, as noted above, the Context-Aware Crowdsourced Task Optimizer also enables task recommendations in the context of voluntary workers. As such, task bundles can also include combinations of paid and voluntary tasks for particular workers depending upon the context of those workers. Note also that prices paid can be set to zero for particular tasks that are bundled with other paid tasks. Paid tasks can have prices set to any desired fixed price or price range by the task publisher and can be automatically adjusted by various embodiments of the Context-Aware Crowdsourced Task Optimizer.

Tasks are performed by workers at a specific context, such as at a particular location, at a particular time, while the worker is driving, etc., and each task has a budget and an optional deadline. A worker can perform multiple tasks, and particular tasks (or multiple instances of a particular task) can be recommended to and performed by multiple workers. Note that in various embodiments, such as, for example, where the task is subject to a time pressure or where the task publisher really needs an answer right away, the task may be offered to multiple persons, and multiple people can accept and all will be paid upon completion, even if only one answer is needed. This provides redundancy to ensure that the task is completed in the time specified by the task publisher.

A task is considered to be successfully completed if it is performed by at least one worker within the deadline of the task. For each successfully completed task, the worker is paid by the task publisher. Note also that the Context-Aware Crowdsourced Task Optimizer can act as an intermediary for task payments where task publishers deposit funds with the Context-Aware Crowdsourced Task Optimizer (or otherwise allow the Context-Aware Crowdsourced Task Optimizer to access funds) to be paid to workers by the Context-Aware Crowdsourced Task Optimizer upon completion of particular tasks.

Note also that in various embodiments, the Context-Aware Crowdsourced Task Optimizer acts as an intermediary to connect workers and tasks. In some of these embodiments, the Context-Aware Crowdsourced Task Optimizer can also receive payments from either or both the worker and the task publisher upon completion of the task (e.g., some fixed fee or percentage of payment for the task bundle). Alternately, in various embodiments, the Context-Aware Crowdsourced Task Optimizer operates under a subscription-based model where workers and/or task publishers pay some fixed or variable fee to the Context-Aware Crowdsourced Task Optimizer, which then operates as a paid intermediary between workers and task publishers for some period of time.

In various embodiments, the Context-Aware Crowdsourced Task Optimizer includes a continuous sensing module that runs on worker's smartphone, or other mobile computing device, and monitors his physical contexts such as his locations and transportation modes, how he reacts to recommended tasks (e.g., whether he actually completes a task that offers a payment of $10 and requires him to drive 5 miles). This allows the Context-Aware Crowdsourced Task Optimizer to recommend a task or task bundle to the right worker at the right time. For example, the Context-Aware Crowdsourced Task Optimizer can recommend a location-specific task to a worker who is willing to perform similar tasks at the offered price and is currently near the location or whose daily commuting route is sufficiently close to that location so that he can conveniently perform the task or task bundle.

As noted above, the Context-Aware Crowdsourced Task Optimizer creates and recommends bundles of tasks to particular workers such that the recommendations are likely to increase the number of successfully completed tasks, while optionally minimizing payments. Towards this purpose, the Context-Aware Crowdsourced Task Optimizer recommends tasks or task bundles to a particular worker when learned worker model corresponding to that worker indicates that there is a sufficiently high probability that the worker will complete that the recommended tasks or task bundles. When a task is recommended to a worker, the worker can respond in one of three ways:

(1) The worker can accept and complete the task bundle within the task deadline;
(2) The worker can reject the task bundle; or
(3) The worker can accept the task bundle but fail to complete some or all of the tasks in the bundle within the task deadline.

Advantageously the optimization process performed by the Context-Aware Crowdsourced Task Optimizer inherently minimizes cases (2) and (3) by considering machine-learned worker-models as part of the optimization and recommendation process. These machine-learned worker models use any of a variety of machine learning processes to automatically model workers' tendencies, preferences towards different types of tasks, completion histories, etc., to construct a machine-learned worker model for each worker. Note that these learned worker models are discussed in further detail below in Section 2.3.

In various embodiments, the Context-Aware Crowdsourced Task Optimizer provides a crowdsourcing platform that proactively runs in the background, and offers task or task bundle recommendations in periodic rounds. In each round, this crowdsourcing platform considers and recommends bundles of tasks (from a pool of available tasks) to potential workers and pushes notifications to remind workers of recommended or accepted task bundles that meet their contexts. As noted above, a worker may either reject or fail to complete a recommended task or task bundle. Such uncompleted tasks are returned to the pool of available tasks to be considered by the Context-Aware Crowdsourced Task Optimizer for the next round. Note that rounds are not necessarily all of the same length of time, and that in various embodiments, the length of time for rounds may be correlated to deadlines associated with one or more tasks in a bundle of tasks. Given the learned worker models, the Context-Aware Crowdsourced Task Optimizer dynamically learns from workers' behavior and adapts to not recommend tasks to a worker who repeatedly rejected (or failed to complete) similar tasks (to avoid cases (2) and (3), above).

2.3 Machine-Learned Worker Models:

Workers may have different tendencies and strategies to accept and execute tasks on the crowdsourcing platform provided by the Context-Aware Crowdsourced Task Optimizer. For example, a worker $\omega$ may prefer to complete tasks with higher payments even though those tasks are potentially more complex and time consuming. The same worker might prefer to complete tasks with lower payments only if those tasks are simpler and require very short trips.

In general, worker's preference towards payment and task complexity and how much payment he expects per unit "effort" (e.g., time spent, distance travelled, etc.) varies across workers. The Context-Aware Crowdsourced Task Optimizer automatically learns and models such worker preferences by analyzing the history of individual workers or particular groups or bundles of workers with respect to various tasks acceptances, task completions, task parameters including payment amounts, complexity or difficulty, distance, time, etc. The learned model for each worker is then used by the Context-Aware Crowdsourced Task Optimizer to evaluate the likelihood that a particular worker will successfully complete a future task.

Note that in the case of new workers, where no history is currently available, factors or profile information such as worker age, gender, demographics, etc., can be used to bootstrap a default model which will then be updated over time as more information becomes available with respect to the worker's history regarding task recommendation acceptances, completions, etc. Further, in various embodiments, an online worker questionnaire or the like can be used to request initial worker preferences, profile information, task history, etc., for use in constructing or learning the initial worker model.

In various embodiments, the Context-Aware Crowdsourced Task Optimizer uses machine-learning processes based on logistic regression to learn individual predictive worker models, $\theta_\omega$, for each worker. In particular, when using the linear regression techniques described herein, each worker model, $\theta_\omega$, is represented as a parameter vector that is learned using regression from task history (e.g., task acceptances, task completions, payment demands, distances traveled, etc.) of the worker $\omega$. However, while these logistic regression processes are discussed below for purposes of explanation (see Section 2.3.1), it should be understood that the Context-Aware Crowdsourced Task Optimizer capable of using any of a large number of machine learning and probabilistic or statistical data mining processes and algorithms to learn predictive worker models based on historical task information associated with each worker. Examples of such machine learning and data mining processes and algorithms include, but are not limited to, decision trees, neural nets, Bayesian classifiers, Support Vector Machines and cased-based (aka non-parametric) learning, regression algorithms such as multivariate polynomial regression, MARS, Locally Weighted Regression, GMDH and neural nets, data mining operations such as clustering (mixture models, k-means and hierarchical), Bayesian networks, Reinforcement Learning, etc.

Regardless of what type of machine-learning processes are used to construct the predictive worker models, the crowdsourcing platform provided by the Context-Aware Crowdsourced Task Optimizer uses these predictive worker models to recommend a task to a worker who will most likely perform the task at the offered payment. For instance, if a task $\tau$ with a small payment is located far from the worker $\omega$, the crowdsourcing platform can decide not to even offer $\tau$ to $\omega$: it can instead assign $\omega$ a more appropriate match and give $\tau$ to other workers who are near its location or are willing to perform it with a small payment.

Further, as discussed throughout this document, it should be understood that the Context-Aware Crowdsourced Task Optimizer does not simply evaluate each task in isolation to select a worker having a highest probability likelihood of completing that task. More specifically, the idea is to ensure that the task completion rate over all tasks is maximized, while optionally minimizing task payments. For example, a worker $\omega_1$ having a lower probability of completing task $\tau_1$ than worker $\omega_2$ may be recommended that task so long as worker $\omega_2$ is likely to complete task $\tau_2$, which worker $\omega_1$ is unlikely to complete. As such, the bundling and recommendation of tasks from a large universe of tasks to potential workers in a large pool of available workers becomes an NP-hard optimization problem that is solved using the processes described herein.

In view of the considerations discussed above regarding data modeling and worker observations, the probability of a worker $\omega$ completing a particular task $\tau$ can be denoted by $P_{\tau\omega}(y=1|x; \theta)$, where y indicates whether the worker completes a task (y=1), or not (y=0), vector $x=(x_1, x_2, \ldots)$ includes real-time parameters (such as payment, distance, task complexity, etc.) and $\theta_\omega=(\theta_1, \theta_2, \theta_3, \ldots)$ is the learned coefficients/weights corresponding to those parameters for each particular worker. In other words, as noted above, the predictive worker model $\theta_\omega$ for each worker is a parameter vector that is learned using regression from task history of each corresponding worker $\omega$. The following discussion expands these concepts.

2.3.1 Regularized Logistic Regression for Predictions:

In various embodiments, the Context-Aware Crowdsourced Task Optimizer uses a regularized logistic regression process to learn predictive worker models. One example of the many possible ways in which this can be accomplished is described below for purposes of explanation. Again, as noted above, it should be understood that the Context-Aware Crowdsourced Task Optimizer is capable of using any of a large number of machine-learning processes to learn, extract, or construct predictive worker models, $\theta_\omega$.

Assuming the use of the aforementioned regularized logistic regression process, the collected observations from a particular worker are denoted by $(x^{(i)}, y^{(i)})$ where $1 \leq i \leq T$. The regression model for each worker operates to minimize the following:

$$\operatorname*{argmin}_\theta \frac{1}{T}\Sigma_{1 \leq i \leq T} \log(h_\theta(x^{(i)}))y^{(i)} + \log(1-h_\theta(x^{(i)}))(1-y^{(i)})^2 + \lambda_r \Sigma_{j=1,2,\ldots} \theta_j^2 \qquad \text{Eqn. (1)}$$

In Equation (1), $$h_\theta(x) = P(y=1 \mid x, \theta) = \frac{1}{1+e^{-\theta^T x}}$$

and $\lambda_r$ is a penalty coefficient, which is a small positive number that shrinks the norm of $\theta$. This parameter is determined by doing cross-validation on the collected samples of data. The penalty term, also known as Ridge regularization, is used to avoid overfitting the model. In various tested embodiments, cross-validation was used to determine $\lambda_r$. Gradient descent based algorithms that iteratively converge to an optimal solution were then used to learn the predictive model $\theta$ that is used to characterize each worker.

2.3.2 Parameterizing Worker's Behavior:

For learning the predictive worker model $\theta$ to characterize each worker (or group of workers), the Context-Aware Crowdsourced Task Optimizer evaluates historical data to extract the parameters that affect a worker's decision to accept or reject a task (or task bundle). These parameters can be determined by assessing different types of context that can possibly attribute to such decisions. Some of the factors that are considered for this purposes include, but are not limited to the following:

1. Payment: the amount of money the worker would receive upon completing a task.
2. Distance: how far a task is located from the worker. This distance may be affected by other tasks accepted by a worker. For example, if multiple tasks are located very close to each other and a worker accepts all of them, then he/she is expected to travel just once to the location of those tasks and to then complete those tasks in that single trip. While the worker could return to the location multiple times to complete multiple bundled tasks at that location, the loss of efficiency and increase in time and distance travelled makes such a scenario less likely.
3. Task Complexity: this is a relative metric that can be evaluated in a variety of ways that may depend upon a workers skills, computing devices, tools, travel capabilities, etc. One simple approach to measure the task complexity is to consider the task duration.
4. Task Deadline: the length of the time window to complete a task.
5. Total Task Duration: the accumulated time that a worker spends to complete all of the tasks in an accepted bundle of tasks.

Given the above parameters, and any of a wide range of additional considerations or parameters (e.g., age, gender, fitness level, education, skills, worker's computing devices, tools, equipment, travel capabilities, quality reviews of worker or task result from task publisher, etc.) the Context-Aware Crowdsourced Task Optimizer uses various machine learning processes (e.g., logistic regression or other processes) to learn a vector of worker characteristics, $\theta$, for each worker or group of workers for use in understanding and modeling the behavior of each worker.

2.3.3 Model Updates:

The learned worker models are updated over time as more data is collected for each worker. Periodic, continuous, or real-time updates to these models over time ensures that the Context-Aware Crowdsourced Task Optimizer has the ability to provide accurate and up to date estimations of workers' predicted behaviors regarding recommended tasks or task bundles. For example, when a new observation pair (x,y) corresponding to a worker is collected, the parameter vector $\theta_\omega$ representing the worker model for that worker is updated as follows: update each parameter $\theta_i$ (e.g., $\theta_1$, $\theta_2, \ldots$) in the worker model $\theta_\omega$, as follows:

$$\theta_i = \theta_i - \alpha(h_\theta(x)-y)x \qquad \text{Eqn. (2)}$$

where $\alpha$ is a weight parameter whose value determines the effect of the latest observation on the overall prediction modeling. Note that a larger $\alpha$ accentuates the impact of the latest observation. For example, if the latest observation is that a particular worker rejects or ignores all recommendations, weighting such observations will skew the model towards lowering the probability that the worker will accept and complete recommended tasks or task bundles. The update equation naturally follows the aforementioned gradient descent approach employed by the Context-Aware Crowdsourced Task Optimizer to solve Equation (1).

Periodic or continuous updates of the predictive worker models allows the crowdsourcing platform of the Context-Aware Crowdsourced Task Optimizer to keep track of the changes in workers' behavior over time. Another advantage of performing model updates as additional worker information becomes available is that instead of processing a large number of samples at once, which can incur undesirable computational complexity or overhead, the Context-Aware Crowdsourced Task Optimizer can update individual worker models in real-time whenever a new sample or data point is received for a particular worker.

2.4 Task Bundling:

As noted above, the Context-Aware Crowdsourced Task Optimizer's task bundling processes are framed as an optimization problem that acts to maximize task completion rates, with optional joint minimization of task costs, by bundling and recommending tasks to workers in view of the predictive models associated with each worker. The input to the task recommendation process includes workers real-time and historical context information, predictive worker models, and task properties (such as location, budget, deadline, etc.). The output of the task recommendation process includes bundles of tasks that are recommended to particular workers. As noted above, the recommendation process considers various objective functions, including maximizing task completion rates where task payments are fixed, and jointly optimizing both task completion rates (i.e., maximizing task completion rates) and task payments (i.e., minimizing task payments) by using adaptive pricing. Note that task bundle size is automatically adjusted by the Context-Aware Crowdsourced Task Optimizer during the optimization process.

In general, any desired payment policy acceptable to (and agreed to) by both the worker and the task publisher can be implemented by the Context-Aware Crowdsourced Task Optimizer. For example, in various embodiments, payment to the worker may be predicated upon how much of a bundle the worker completes. For example, in various embodiments, the worker is only paid if he completes the entire bundle of tasks. Alternately, in various embodiments, the worker is paid a lesser amount or partial payments when he completes a part of a bundle of tasks, with a bonus paid on completion of the entire bundle, etc.

Figure 3:
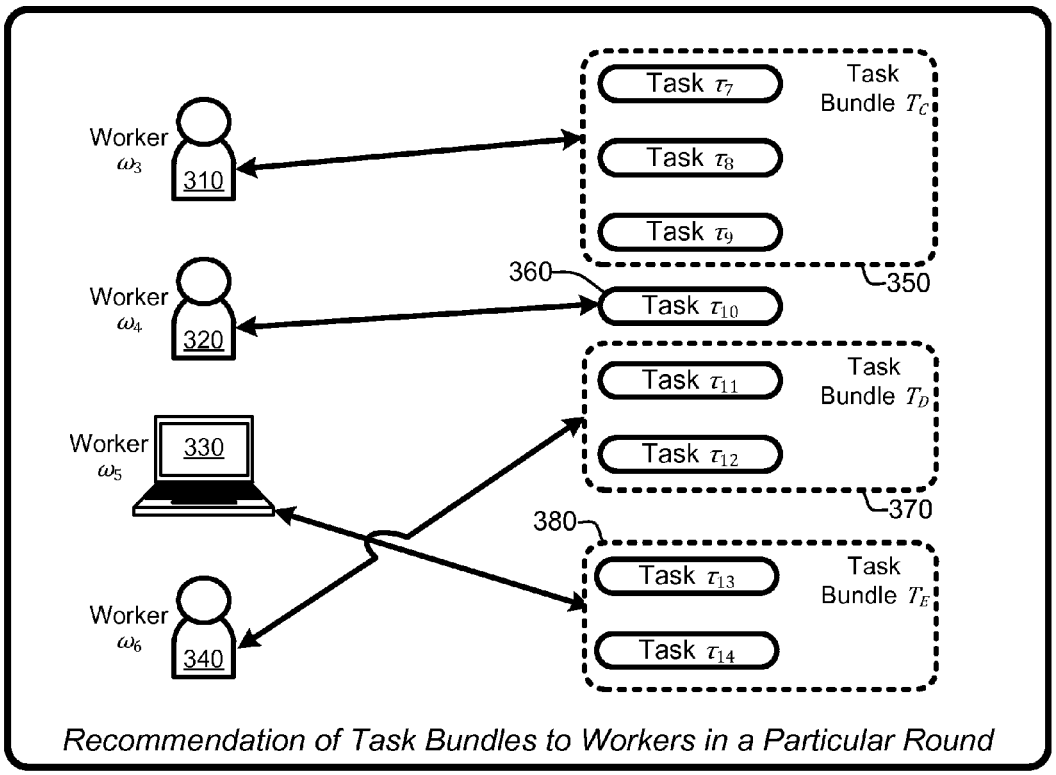
FIG. 3 illustrates exemplary of the recommendation of task bundles to workers in a particular round, as described herein.

As noted above, in various embodiments, the Context-Aware Crowdsourced Task Optimizer performs task and task bundle recommendations in rounds. When workers receiving task or task bundle recommendations do not accept the recommended tasks within some period time (e.g., a task acceptance round), the task recommendation module will then recommend some or all of those tasks to alternate workers in subsequent rounds. FIG. 3 illustrates exemplary of the recommendation of task bundles to workers in a particular round. In general, FIG. 3 shows several task/worker pairs provided in a particular round, which includes both human (310, 320, 340) and virtual workers (330), single tasks paired to workers, and task bundles paired to workers. More specifically, FIG. 3 shows task bundle $T_C$ (350) paired or recommended to human worker $\omega_3$ (310). Single task $\tau_4$ (360) is shown as being paired or recommended to human worker $\omega_4$ (320). Task bundle $T_D$ (370) is shown as being paired or recommended to human worker $\omega_6$ (370). Finally, task bundle $T_E$ (380) is shown as being paired or recommended to virtual worker $\omega_5$ (330).

Note that in the event that any of the workers shown as paired with particular tasks or tasks bundles fails to either accept the recommended tasks to fails to complete those tasks within some predefined deadline, the Context-Aware Crowdsourced Task Optimizer operates will recommend those unaccepted or uncompleted tasks to other workers. Further, it should be understood that when those unaccepted or uncompleted tasks are recommended to other workers, the way in which those tasks are bundled is likely to change since those bundles are optimized in each round, relative to any other available tasks and workers, as if that round were the only round.

2.4.1 Simple Task Bundling Examples:

Tasks can be bundled in a variety of ways, and it should be understood that tasks from the same or different task publishers can be bundled. A simple example of a bundle of tasks from different publishers to a single worker is the case where a flying drone (e.g., a virtual worker in this case) delivers multiple packages (tasked from one or more different task publishers) to different recipients in a single trip. In this example, the task bundling may take into account various worker contexts such as drone range, lifting capabilities, and task contexts such as delivery addresses, package sizes, package weights, etc. Note that the Context-Aware Crowdsourced Task Optimizer, the drone (or a human or other computer controlling the drone) can plan flight routes to allow the drone to complete the bundled tasks in an efficient manner.

Another simple example involving drone delivery is a pizza maker that has a drone that is capable of delivering pizzas to paying customers. In this case, there may be multiple task publishers and one worker. For example, task publishers (in this case one or more humans that want one or more pizzas and are willing to pay up to a particular price) request pizza be delivered as their task, but don't necessarily care which restaurant provides the pizza. The worker in this case is the pizza maker (and his drone), and his current context is that he has cooked pizzas at some location and a drone that can deliver them to multiple locations within some range of the pizza maker's location. The pizza maker is paid upon completion of each task (i.e., delivery of one or more pizzas) to each task publisher (i.e., each customer). Note that in a variant of this example, the pizza maker can be considered the task publisher (where he has already been paid for pizzas by customers) and the drone (or a free-lance pizza delivery man with his own car) could be a third party worker that accepts pizza delivery tasks to deliver pizzas from the pizza maker to the customers for some price for delivery of a bundle of one or more pizza delivery tasks to one or more customers.

2.4.2 Maximizing the Number of Completed Tasks:

The set of all available tasks is denoted by $T=\{\tau_1, \ldots, \tau_m\}$. The set of workers is denoted by $\Omega=\{\omega_1, \ldots, \omega_n\}$. Note that $\Omega$ consists of two kinds of workers. The first type are those who are currently available and are actively looking for tasks. The other type of workers are the ones that are currently unavailable but, based on prior information, are expected to be available before tasks' deadlines. Further, as noted above, workers may be real or virtual (e.g., humans, computing devices and applications or tasks running on those computing devices, robots, drones, driverless taxis, etc. A per-worker task acceptance variable $X_{\tau\omega}$ is defined as follows: $X_{\tau\omega}=1$ if worker $\omega(\epsilon\Omega)$ accepts a recommended task ($\epsilon T$), otherwise $X_{\tau\omega}=0$. Further, $P_{\tau\omega}$ represents the probability that worker $\omega$ accepts task $\tau$.

In addition, the function $g_\omega(T_\omega)$ represents the expected number of tasks that are accepted by worker $\omega$ if subset ($T_\omega \subset T$) of tasks is recommended that worker. This concept is illustrated by Equation (3), as follows $$g_\omega(T_\omega)=E[\Sigma_{\tau\epsilon T_\omega}P_{\tau\omega}X_{\tau\omega}] \quad \text{Eqn. (3)}$$

Given the above considerations, the Context-Aware Crowdsourced Task Optimizer operates to automatically distribute or recommend tasks and task bundles to particular workers (or particular groups of workers) such that the overall number of tasks that are successfully completed is maximized. This optimization problem can be formally stated as an objective function subject to a set of corresponding constraints, as illustrated by Equation (4), where:

$$\text{Objective Function:} \max \mathcal{G}(T,\Omega) = \Sigma_{\omega \in \Omega} g_\omega(T_\omega)$$

$$\text{Constraints:} \forall \omega_i \neq \omega_j \in \Omega, T_{\Omega_i} \cap T_{\omega_j} = \emptyset \qquad \text{Eqn. (4)}$$

The objective function of Equation 4 maximizes the expected number of successfully assigned tasks after matching all tasks and workers. These exemplary constraints ensure that each task is recommended to at most one worker. However, it should be understood that the Context-Aware Crowdsourced Task Optimizer can also assign a single task to multiple workers by simply replicating multiple instances of that task.

2.4.3 Computational Complexity:

It is straightforward to observe the combinatorial complexity of the constrained objective function of Equation (4). In particular, for each worker, there is an exponential number of different suitable task sets for which $g_\omega(.)$ can be evaluated. The probability that a worker completes a particular task is not only dependent on the task, but is also a function of the set of tasks that he/she has accepted.

Further, even if the probabilities $P_{\tau\omega}$ could be independently computed for each worker $\omega$ and were not affected by the tasks in $T_\omega$, the constrained objective function of Equation (4) could be seen as an instance of a Knapsack Problem which is known to be NP-hard. Besides, workers have different characteristics that result in distinct $g_\omega(.)$ functions for each individual, rendering the problem even more complex. Thus, no optimal solution can be found in polynomial time (unless P=NP). However, by considering and exploiting monotonicity and submodularity of the objective function, the Context-Aware Crowdsourced Task Optimizer provide computationally feasible task identification and recommendations with tight optimality bounds, as discussed in further detail below.

2.4.4 Computing Expected Number of Tasks Accepted by Workers:

To compute the objective function, $g_\omega(T_\omega)$, for a set of tasks, the Context-Aware Crowdsourced Task Optimizer considers the effect of those tasks on the probability as a whole. The probability that worker $\omega$ accepts a task $\tau(y_\tau=1)$ is not only a function of task $\tau$ but is also a function of the set of tasks $(T_\omega)$ that is recommended to that worker.

Of the various parameters in the predictive worker models, $\theta_\omega$, discussed above, task distance and workers total duration are two of the parameters that are most affected by the set $T_\omega$. Finding an accurate minimum traveling distance required for each task, given the set $T_\omega$, can be very challenging. In fact, this problem becomes equivalent to solving a classical traveling salesman problem which is known to be NP-hard.

Consequently, in various embodiments, the Context-Aware Crowdsourced Task Optimizer computes the distance of each task using a nearest neighbor greedy algorithm that is an approximate solution with optimality guarantees. Note that in this case it is assumed that the worker chooses the nearest unvisited task in $T_\omega$ as his next move. However, as discussed throughout this document, it should be understood that the Context-Aware Crowdsourced Task Optimizer is fully capable of using other optimization processes in addition to the greedy algorithms discussed herein.

2.4.5 Properties of the Objective Function:

The objective function $g_\omega(T_\omega)$ is modelled as a monotonically increasing and submodular function. The monotonicity property comes from the definition of $g_\omega(T_\omega)$ provided above. Further, $g_\omega(T_\omega)$ is considered to be submodular by complying with the following two conditions: (1) it is positive, and (2) the marginal value of adding a new task is monotonically decreasing as the number of tasks increase. Equation (5) below, considers both monotonicity and submodularity, as follows:

$$g_\omega(T_\omega^1 \cup \tau) - g_\omega(T_\omega^1) \geq g_\omega(T_\omega^2 \cup \tau) - g_\omega(T_\omega^2) \qquad \text{Eqn. (5)}$$

where $T_\omega^1 \subset T_\omega^2$ are subsets of tasks in task set $T_\omega$.

The monotonicity property follows directly from positiveness of the probability function. The submodularity property is intuitive. In particular, if workers already have a larger number of tasks in their to-do list they might not be as interested in a new available task compared to the case where they have a smaller subset of to-do tasks and the same new task is offered to them. Further, at some point, workers will stop accepting new tasks (or will stop completing new tasks that are accepted), no matter how many more are recommended since there is an inherent finite limit as to how many tasks a worker can perform.

Note also that the submodular behavior of workers with respect to an increasing number of tasks is a characteristic of workers that has been observed in multiple crowd-sourcing worker studies. In the predictive worker model $\theta_\omega$, the parameter corresponding to the total task duration establishes the submodular property of the objective function.

2.4.6 Efficient Solution to the Objective Function:

Given that $g_\omega(.)$ is both monotonic and submodular, various solutions can be used to optimize the objective function of Equation (4). For example, a simple greedy approach can be proven to give a ½-approximation to the solution. However, more sophisticated approaches provide improved optimization guarantees. In fact, there are many well-known constrained optimization techniques that can be adapted for use by the Context-Aware Crowdsourced Task Optimizer. As such, it should be understood that the Context-Aware Crowdsourced Task Optimizer is not intended to be limited to the use of greedy optimization techniques such as those described herein for purposes of explanation. For example, given the submodular and monotonic objective function described above, a randomized continuous greedy approach can be shown to achieve the following bounded approximation to the optimal solution:

$$\mathcal{G}(T,\Omega) \geq (1 - 1/e) \text{OPT} \qquad \text{Eqn. (6)}$$

Algorithm 1, below, provides one of many possible processes for solving the constrained optimization problem of the objective function shown in Equation (4). This algorithm exploits a randomized continuous greedy approach to repeatedly compute a marginal benefit, $\Delta g_\omega(t)$, achieved by assigning a new task to a worker. This marginal benefit is computed in Step 2 of Algorithm 1. For computing the marginal benefit $\Delta g_\omega(t)$ at iteration t of the algorithm, the Context-Aware Crowdsourced Task Optimizer considers the tasks that have already been assigned to $\omega$ at that iteration, while adjusting the distance and total task duration of the corresponding coefficients of $\theta$.

| Algorithm 1: Maximizing Completed Tasks with Fixed Task Payments |
| --- |
| Input: A set of workers $\Omega$ with predictive worker model $\theta_\omega$, and a set of tasks $\mathcal{T}$ with properties for each task $\tau \in \mathcal{T}$ |
| Output: Recommendation of a bundle of tasks $\mathcal{T}_\omega \subset \mathcal{T}$ to each worker $\omega \in \Omega$ |
| Purpose: Maximize expected task acceptance rate $\mathcal{G}(\mathcal{T}, \Omega)$ |

-continued

Algorithm 1: Maximizing Completed Tasks with Fixed Task Payments

Steps:
1. Let $\delta = 1/(mn)^2$, where m is the number of tasks and n is the number of workers (although any other desired value of $\delta$ can be used here). Initialize $t = 0$ and $\mathcal{P}_{\tau\omega} = 0$ for all $\tau$, $\omega$
2. Create set $R_\omega(t)$ as a random set which contains each task $\tau$ with probability $\mathcal{P}_{\tau\omega}(t)$. Estimate the expected marginal profit of assigning task $\tau$ to worker $\omega$, by taking the average of independent samples, i.e., $\Delta g_\omega(t) = E[g_\omega(R_\omega(t) + \tau) - g_\omega(R_\omega(t))]$
3. For each $\omega$, let $\tau_\omega(t) = \text{argmax}\Delta g_\omega(t)$ be the preferred task for worker $\omega$
4. Set $\mathcal{P}_{\tau\omega}(t + \delta) = \mathcal{P}_{\tau\omega}(t)$ for the preferred task $\tau = \tau_\omega(t)$ and set $\mathcal{P}_{\tau\omega}(t + \delta) = \mathcal{P}_{\tau\omega}(t)$ for all other tasks
5. Increment t by a step-size: $t = t + \delta$; if $t < 1$, go back to Step 2
6. Allocate each task $\tau$ independently with a probability of $\mathcal{P}_{\tau\omega}(1)$ to worker $\omega$

2.5 Maximizing Utility with Adaptive Pricing:

As noted above, in the context of variable pricing, the Context-Aware Crowdsourced Task Optimizer exploits adaptive pricing to maximize the expected utility of the platform. For this purpose, a utility function is defined below that pursues a dual purpose that maximizes task acceptance rates while minimizing the payments. The utility function for recommending set of tasks $T_\omega \subset T$ to worker $\omega$ is defined by Equation (7) as:

$$g_\omega^{util}(\mathcal{T}_\omega) = E\left[\Sigma_{\tau \in \mathcal{T}_\omega} P_{\tau\omega} X_{\tau\omega} \exp\left(-\lambda \frac{\pi_{\tau\omega}}{\pi_b}\right)\right] \quad \text{Eqn. (7)}$$

where the variable $\pi_b$ is a maximum budget or price for the task $\tau$ (typically set or specified by the task publisher), the variable $\lambda_{\tau\omega}$ is the payment to be offered to worker $\omega$ for doing $\tau$, the variable $\lambda$ is a parameter defined by the crowdsourcing platform provided by the Context-Aware Crowdsourced Task Optimizer for use in enforcing different utility objectives.

In view of Equation (7), it can be seen that there is a tradeoff between task payment $\pi_\tau$ and the probability of task completion $P_{\tau\omega}$. In particular, a higher payment will increase the probability that a task is completed but will decrease the overall utility as a result of the increased task price. Further, a larger value of $\lambda$ will result in decreasing the overall task budget, but at the cost of lower task acceptance and completion rates. In view of these considerations, this resulting optimization problem can be formally stated as an objective function subject to a set of corresponding constraints, as illustrated by Equation (8), where:

Objective Function: $\max \mathcal{G}^{util}(T,\Omega) = \Sigma_{\omega \in \Omega} g_\omega^{util}(T_\omega)$, Constraints: $\forall_{\tau \in T} 0 \leq \pi_{\tau\omega} \leq \pi_b$, and $\forall_{\omega i \neq \omega j \in \Omega} T_{\omega i} = \emptyset$ \quad Eqn. (8)

The first constraint (i.e., $\forall_{\tau \in T} 0 \leq \pi_{\tau\omega} \leq \pi_b$) ensures that the payments are non-negative and less than tasks' budgets. The second constraint (i.e., $\forall_{\omega i \neq \omega j \in \Omega} T_{\omega j} = \emptyset$) enforces disjoint distribution of tasks.

2.5.1 Computing the Utility Function:

To compute the utility function, $g_\omega^{util}(T^\omega)$, over a set of tasks, the Context-Aware Crowdsourced Task Optimizer first finds optimized payments by maximizing $$P(\pi_{\tau\omega}^* \mid \mathcal{T}_\omega) \exp\left(-\lambda \frac{\pi_{\tau\omega}}{\pi_b}\right),$$

where optimal payments vary with respect to different values of $\lambda$. For example, by increasing $\lambda$, a higher reward will be given to reduced task payments rather than task completion. By setting $\lambda=0$, the utilization objective becomes the same as the task completion objective function discussed above, i.e., $g_\omega^{util}(.) = g_\omega(.)$. In computing the utility function, the Context-Aware Crowdsourced Task Optimizer follows steps similar to those discussed above for computing $g_\omega(.)$.

2.5.2 Properties of the Utility Function:

As with the objective function discussed above, the utility function, $g_\omega^{util}(T_\omega)$, is also monotonic and submodular. The monotonicity is apparent from the utility function's definition. Submodularity of this utility function can be proven by assuming that $\tau$ is a new task. In view of this assumption, it can be proven that if $T_\omega^1 \subset T_\omega^2 \subset T$ the following property is true:

$$P_{\tau\omega}(\pi_{\tau\omega}^1 \mid \mathcal{T}_\omega^1)\exp\left(-\lambda\frac{\pi_{\tau\omega}^1}{\pi_b}\right) > P_{\tau\omega}(\pi_{\tau\omega}^2 \mid \mathcal{T}_\omega^2)\exp\left(-\lambda\frac{\pi_{\tau\omega}^2}{\pi_b}\right) \quad \text{Eqn. (9)}$$

where $\pi_{\tau\omega}$ is the optimal payment determined for a task $\tau$ that is assigned to a worker $\omega$ for $i=1$ and 2. Since $\pi_\tau^1$ is optimal, then $$P_{\tau\omega}(\pi_{\tau\omega}^1 \mid \mathcal{T}_\omega^1)\exp\left(-\lambda\frac{\pi_{\tau\omega}^1}{\pi_b}\right) > P_{\tau\omega}(\pi_{\tau\omega}^2 \mid \mathcal{T}_\omega^1)\exp\left(-\lambda\frac{\pi_{\tau\omega}^2}{\pi_b}\right) \quad \text{Eqn. (10)}$$

Since $g_\omega(.)$ is submodular, the following inequality holds:

$$P_{\tau\omega}(\pi_{\tau\omega}^2 \mid \mathcal{T}_\omega^1)\exp\left(-\lambda\frac{\pi_{\tau\omega}^2}{\pi_b}\right) > P_{\tau\omega}(\pi_{\tau\omega}^2 \mid \mathcal{T}_\omega^2)\exp\left(-\lambda\frac{\pi_{\tau\omega}^2}{\pi_b}\right) \quad \text{Eqn. (11)}$$

From Equations 10 and 11 it can be shown that the property of Equation (9) is true. Thus, the utility function, $g_\omega^{util}(T_\omega)$, is submodular.

2.5.3 Efficient Solution to the Utility Function:

In view of the submodularity and monotonicity of the utility function, $g^{util}(.)$, the Context-Aware Crowdsourced Task Optimizer can use an approach similar to the one used to solve the objection function of Equation (4). In particular, the Context-Aware Crowdsourced Task Optimizer again uses a randomized continuous greedy approach to solve the utility function of Equation (8). Again, as noted above, there is a very large number of well-known constrained optimization techniques that can be adapted for use by the Context-Aware Crowdsourced Task Optimizer. As such, it should be understood that the Context-Aware Crowdsourced Task Optimizer is not intended to be limited to the use of greedy optimization techniques such as those described herein for purposes of explanation.

In view of these considerations, Algorithm 2, described below, uses a greedy approach to solve the utility function of Equation (8). First, the Context-Aware Crowdsourced Task Optimizer uses Algorithm 2, discussed below, to compute optimal payments for maximizing the utility function for each task/worker pair. Then, the Context-Aware Crowdsourced Task Optimizer uses Algorithm 1 to find the task bundle recommendations for each worker.

| Algorithm 2: Maximizing Utility with Dynamic Task Payments |
| --- |
| Input: Set of workers $\Omega$ with predictive worker model $\theta_\omega$, and set of tasks $\mathcal{T}$ with properties (including maximum value: $val_\tau$) for each task $\tau \in \mathcal{T}$ |
| Output: Recommendation of a bundle of tasks $\mathcal{T}_\omega \subset \mathcal{T}$ to each worker, $\omega \in \Omega$ |
| Purpose: Maximize expected platform utility $\mathcal{G}^{util}(\mathcal{T}, \Omega)$ which has the dual purpose of maximizing task completion rate and reducing payments |
| Steps: |
| 1  For each $\tau \in T$ and each $\omega \in \Omega$ solve the following optimization problem to find an optimal task payment $\pi_{\tau\omega}^*$ such that: $\pi_{\tau\omega}^* = \operatorname{argmax}_\pi \exp\left(-\lambda \frac{\pi}{\pi_b}\right) \mathcal{P}_{\tau\omega}$ |
| 2  For each task $\tau \in \omega$, update the task properties by setting its payments to personalized $\pi_{\tau\omega}^*$ values |
| 3  Run algorithm 1, with updates task properties from step 2, and substituting the objective by $\mathcal{G}^{util}(\mathcal{T}, \Omega)$ to determine the bundle assignments |

2.6 Supporting Arbitrary Task Contexts:

The preceding discussion of some of the various algorithms and embodiments of the Context-Aware Crowdsourced Task Optimizer algorithms primarily considered location context and a relatively long task completion deadline for purposes of explanation. However, it should be clear that, as noted above, the Context-Aware Crowdsourced Task Optimizer can support an arbitrary number of contexts (i.e., specifications or requirements for particular tasks) and can support deadlines of any time, by simply adjusting the utility or probability $P_{\tau\omega}$ (associated with assigning task $\tau$ to worker $\omega$).

For example, consider a traffic monitoring task that requests workers in a "driving" context (i.e., one of the task parameters, $x_i$, is a requirement that the worker is driving a vehicle) and on a specific freeway. If the task is real-time or has a short deadline such that the platform needs to recruit workers who are currently driving on the specific freeway, the Context-Aware Crowdsourced Task Optimizer sets $P_{\tau\omega}=0$ for all workers $\omega$ who are not currently driving on that freeway. Similarly, if the deadline is long, the Context-Aware Crowdsourced Task Optimizer evaluates worker models to predict whether a worker will be driving on that freeway within the time window specified by the deadline, and if not, it sets his $P_{\tau\omega}=0$.

Note that when the Context-Aware Crowdsourced Task Optimizer assigns or recommends a task $\tau$, both Algorithm 1 and Algorithm 2 treat all workers $\omega$ having a $P_{\tau\omega}=0$ as not suitable for the task. In other words, for future assignments, the Context-Aware Crowdsourced Task Optimizer considers worker models to determine a probabilistic measure of worker availability and will not recommend tasks to workers that are not expected to be available to complete the task within the task deadline.

2.7 Context Feedback to Task Publishers:

When posting, offering, or otherwise publishing a task via the Context-Aware Crowdsourced Task Optimizer, the task publisher will typically provide a maximum payment amount for that task and a task deadline. Generally, task publishers prefer to make the minimum payment necessary for their tasks to be completed (with high probability) within an acceptable deadline. However, in many cases, setting a proper payment amount without offering too much (or too little) may be particularly challenging for task publishers, especially if they are not familiar with the behaviors and payment demands of available workers. Further, task publishers may or may not be aware that relatively small changes in task deadlines can sometimes have large effects on task pricing.

Clearly, in view of the preceding discussion, there is a tradeoff between task payment amounts and task completion rates, where too small a payment may result in a poor completion rate, and where too large a payment may result in unnecessary expense to the task publisher. Similarly, task deadlines may also have large effects on task pricing. Further, many other task contexts may also effect task completion rates.

As such, it should be understood that any one or more of the contexts (e.g., pricing, deadline, location, etc.) associated with each task can affect both the task completion rate and task pricing (in the case of dynamic pricing). However, as discussed above, the Context-Aware Crowdsourced Task Optimizer considers each of the contexts associated with each task to optimize task completion rates and pricing when making task recommendations to individual workers. Advantageously, this means that the Context-Aware Crowdsourced Task Optimizer is fully capable of performing "what-if" or dry-run type computations for any or all of the task contexts to provide feedback to task publishers prior to task publications.

In other words, in various embodiments the predictive worker models and algorithms provided by the Context-Aware Crowdsourced Task Optimizer are considered in combination with different values or ranges of particular task contexts to provide automated task context feedback to task publishers. This enables the task publisher to work with an interactive user interface component of the Context-Aware Crowdsourced Task Optimizer to adjust or modify one or more task contexts (e.g., task pricing, deadlines, etc.) to see what effect those adjustments will have on the predicted task completion rate. As such, the task publisher can specify one or more tasks, and then adjust or otherwise modify any associated contexts before the task is actually offered or recommended to workers. With each task context adjustment, the Context-Aware Crowdsourced Task Optimizer will then present the task publisher with estimates of probabilistic completion rates (and optional task pricing) corresponding to the current task contexts. The task publisher can continue to adjust any of these contexts until he is satisfied with the predicted completion rates, pricing, deadlines, etc.

For example, consider task pricing as one of many possible task contexts that can be adjusted. In the case of pricing, the Context-Aware Crowdsourced Task Optimizer will estimate the task completion rate for each of a series or range of maximum payments, $\pi_i$, set, selected, or otherwise specified by the task publisher. In particular, for each payment amount, $\pi_i$, to be modelled, the Context-Aware Crowdsourced Task Optimizer uses the worker models learned from each worker's historical data, and runs Algorithm 1, with $P_{\tau\omega}$ providing the probability of worker $\omega$ completing the task $\tau$ for the payment being considered, to determine the probability that the task will actually be completed. The results are then provided to the task publisher via a user interface in the form of a graph, table, chart, etc., that presents task completion rates for different payment values. This allows the task publisher to budget tasks before actually posting, offering or otherwise publishing a task via the Context-Aware Crowdsourced Task Optimizer so that the task publisher can make an informed decision on setting a maximum payment that is predicted to achieve an acceptable task completion rate.

Figure 4:
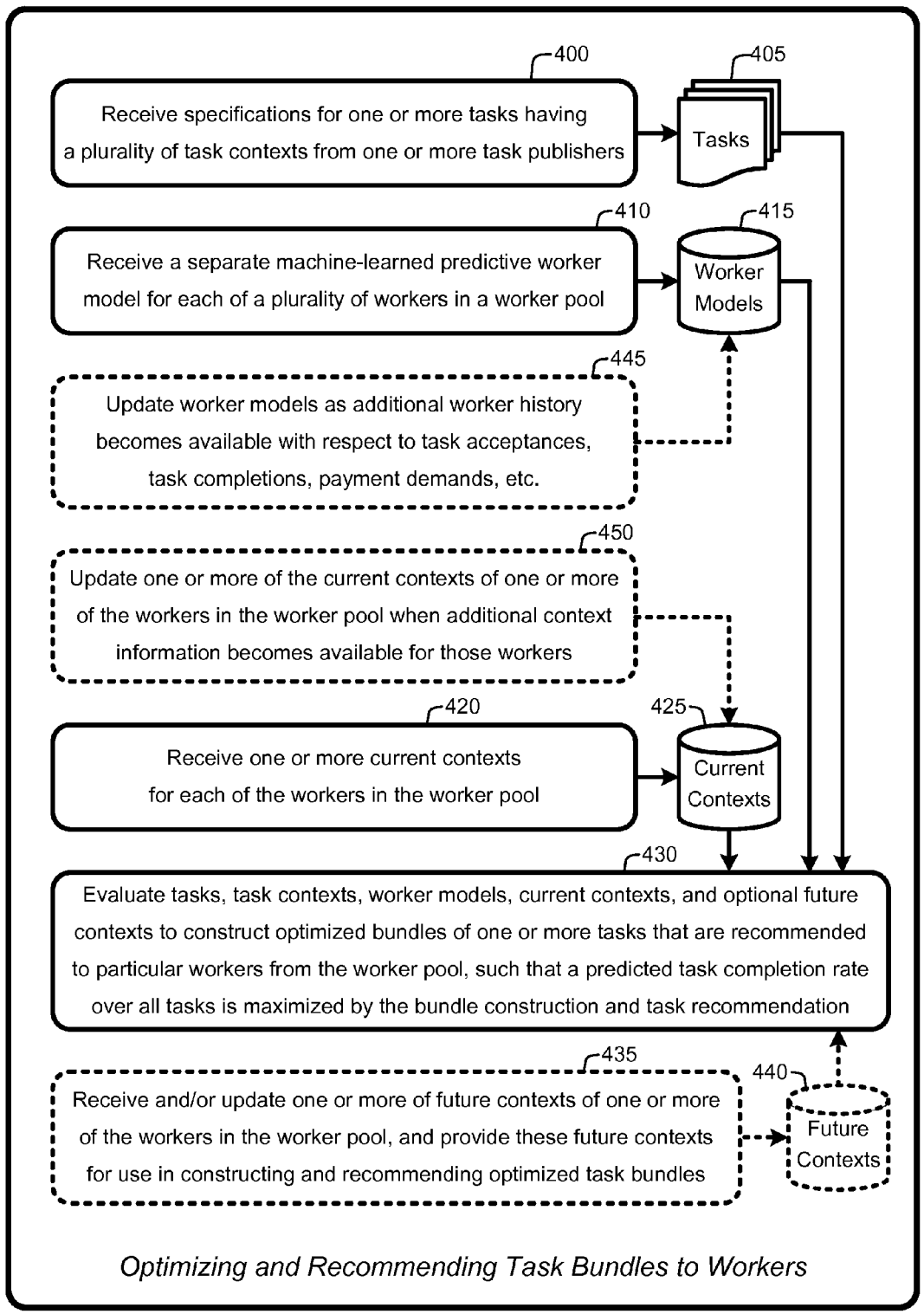
FIG. 4 illustrates a general system flow diagram that illustrates exemplary methods for implementing various embodiments of the Context-Aware Crowdsourced Task Optimizer, as described herein.

3.0 Operational Summary:

The processes described above with respect to FIG. 1 through FIG. 3, and in further view of the detailed description provided above in Sections 1 and 2, are illustrated by the general operational flow diagram of FIG. 4. In particular, FIG. 4 provides an exemplary operational flow diagram that summarizes the operation of some of the various embodiments of the Context-Aware Crowdsourced Task Optimizer. Note that FIG. 4 is not intended to be an exhaustive representation of all of the various embodiments of the Context-Aware Crowdsourced Task Optimizer described herein, and that the embodiments represented in FIG. 4 are provided only for purposes of explanation.

Further, it should be noted that any boxes and interconnections between boxes that are represented by broken or dashed lines in FIG. 4 represent optional or alternate embodiments of the Context-Aware Crowdsourced Task Optimizer described herein, and that any or all of these optional or alternate embodiments, as described below, may be used in combination with other alternate embodiments that are described throughout this document.

In general, as illustrated by FIG. 4, the Context-Aware Crowdsourced Task Optimizer begins operation by receiving (400) specifications for one or more tasks (405) having a plurality of task contexts from one or more task publishers. The Context-Aware Crowdsourced Task Optimizer also receives (410) a separate machine-learned predictive worker model (415) for each of a plurality of workers in a worker pool. In addition, the Context-Aware Crowdsourced Task Optimizer receives (420) one or more current contexts (425) for each of the workers in the worker pool.

The Context-Aware Crowdsourced Task Optimizer then evaluates (430) the tasks (405) and any associated task contexts, the worker models (415), the current contexts (425), and optional future contexts (440) to construct optimized bundles of one or more tasks that are recommended to particular workers from the worker pool, such that a predicted task completion rate over all tasks is maximized by the bundle construction and task recommendation. As discussed above, in various embodiments, the bundle optimization performed by the Context-Aware Crowdsourced Task Optimizer also jointly minimizes prices paid for tasks while maximizing task completion rates.

In various embodiments, the Context-Aware Crowdsourced Task Optimizer also receives (435) and/or updates one or more of the future contexts (440) of one or more of the workers in the worker pool, and provides these future contexts for use in constructing and recommending optimized task bundles. In addition, in various embodiments, the Context-Aware Crowdsourced Task Optimizer updates (445) worker models (415) as additional worker history becomes available with respect to task acceptances, task completions, payment demands, etc. Finally, in various embodiments, the Context-Aware Crowdsourced Task Optimizer updates (450) one or more of the current contexts (425) of one or more of the workers in the worker pool when additional context information becomes available for those workers.

Figure 5:
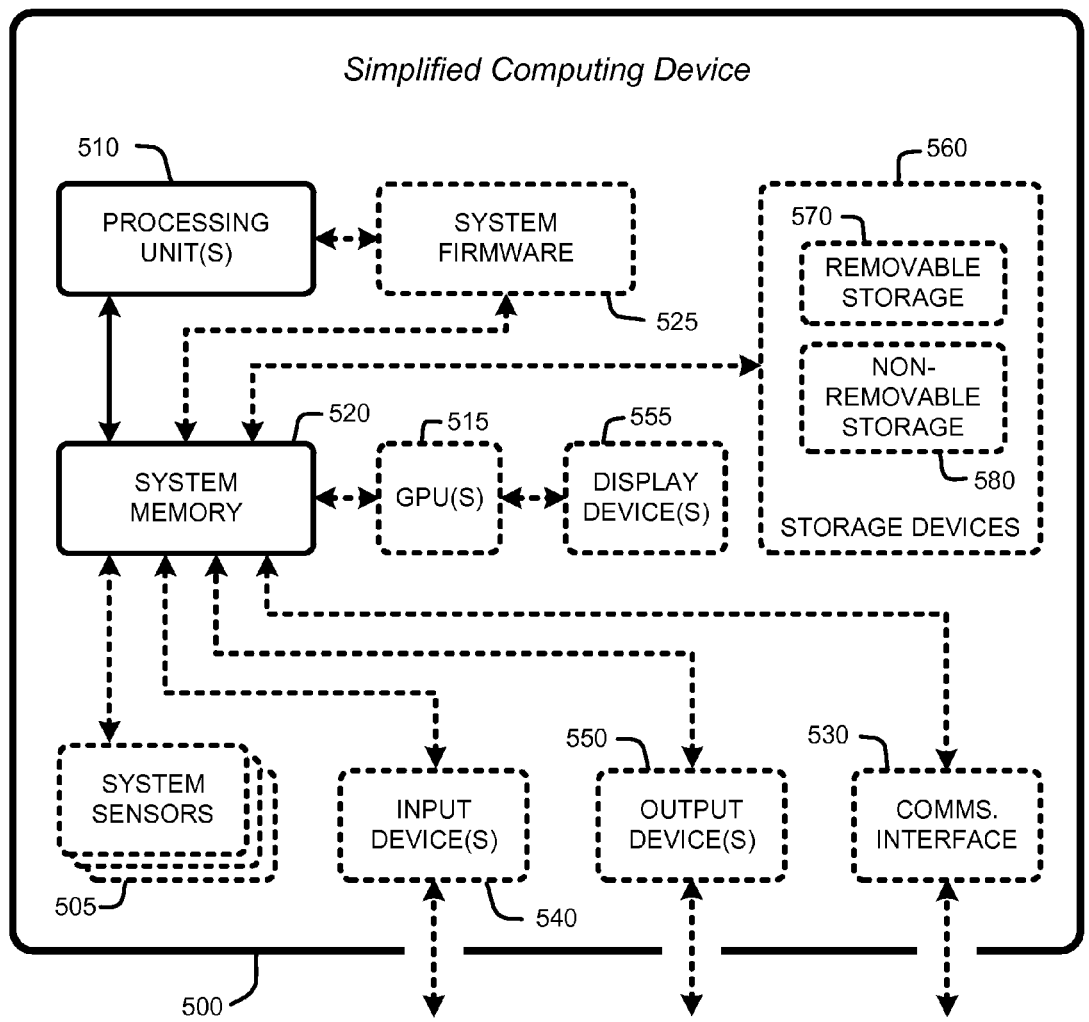
FIG. 5 is a general system diagram depicting a simplified general-purpose computing device having simplified computing and I/O capabilities for use in implementing various embodiments of the Context-Aware Crowdsourced Task Optimizer, as described herein.

4.0 Exemplary Operating Environments:

The Context-Aware Crowdsourced Task Optimizer described herein is operational within numerous types of general purpose or special purpose computing system environments or configurations. FIG. 5 illustrates a simplified example of a general-purpose computer system on which various embodiments and elements of the Context-Aware Crowdsourced Task Optimizer, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Examples of such devices operable with the Context-Aware Crowdsourced Task Optimizer, include, but are not limited to, portable electronic devices, wearable computing devices, hand-held computing devices, laptop or mobile computers, communications devices such as cell phones, smartphones and PDA's, multiprocessor systems, microprocessor-based systems, set top boxes, programmable consumer electronics, network PCs, minicomputers, audio or video media players, handheld remote control devices, etc. Note also that the Context-Aware Crowdsourced Task Optimizer may be implemented with any touchscreen or touch-sensitive surface that is in communication with, or otherwise coupled to, a wide range of electronic devices or objects.

To allow a device to implement the Context-Aware Crowdsourced Task Optimizer, the computing device 500 should have a sufficient computational capability and system memory to enable basic computational operations. In addition, the computing device 500 may include one or more sensors 505, including, but not limited to, GPS devices, accelerometers, cameras, capacitive sensors, proximity sensors, microphones, multi-spectral sensors, etc. Further, the computing device 500 may also include optional system firmware 525 (or other firmware or processor accessible memory or storage) for use in implementing various embodiments of the Context-Aware Crowdsourced Task Optimizer.

As illustrated by FIG. 5, the computational capability of computing device 500 is generally illustrated by one or more processing unit(s) 510, and may also include one or more GPUs 515, either or both in communication with system memory 520. Note that that the processing unit(s) 510 of the computing device 500 may be a specialized microprocessor, such as a DSP, a VLIW, or other micro-controller, or can be a conventional CPU having one or more processing cores, including specialized GPU-based cores in a multi-core CPU.

In addition, the simplified computing device 500 may also include other components, such as, for example, a communications interface 530. The simplified computing device 500 may also include one or more conventional computer input devices 540 or combinations of such devices (e.g., touchscreens, touch-sensitive surfaces, pointing devices, keyboards, audio input devices, voice or speech-based input and control devices, video input devices, haptic input devices, devices for receiving wired or wireless data transmissions, etc.). The simplified computing device 500 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device 500 may also include a variety of computer readable media. Computer readable media can be any available media that can be accessed via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Context-Aware Crowdsourced Task Optimizer described herein, or portions thereof, may be stored, received, transmitted, or read from any desired combination of computer or machine readable media or storage devices and communication media in the form of computer executable instructions or other data structures.

Finally, the Context-Aware Crowdsourced Task Optimizer described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Context-Aware Crowdsourced Task Optimizer has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Context-Aware Crowdsourced Task Optimizer. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for maximizing task completion rates, comprising:
   using a computer to perform process actions for:
   receiving specifications for multiple different tasks, each task having a plurality of task contexts from one or more task publishers;
   receiving a separate machine-learned predictive worker model for each of a plurality of non-human virtual workers in a worker pool;
   receiving one or more current contexts for each of the non-human virtual workers in the worker pool;
   jointly evaluating all of the multiple different tasks, the task contexts, the worker models, and the current contexts to construct a plurality of optimized bundles of one or more of the multiple different tasks, the plurality of bundles together including all of the multiple different tasks;
   the joint evaluation further comprising formulating the combination of the multiple different tasks, the task contexts, the worker models, and the current contexts as a submodular and monotonic objective function and solving that objective function as a constrained optimization problem to compute a single predicted task completion rate that covers all of the multiple different tasks; and
   automatically recommending each of the bundles to particular non-human virtual workers from the worker pool, such that the single predicted task completion rate over all of the multiple different tasks is maximized by the bundle construction and task recommendation.

2. The computer-implemented process of claim 1 wherein one or more of the current contexts of one or more of then workers are derived from one or more sensor readings provided by one or more computing devices associated with those workers.

3. The computer-implemented process of claim 1 further comprising:

receiving a separate machine-learned predictive worker model for each of a plurality of human workers in a worker pool; and the joint evaluation further comprising a combination of non-human virtual workers and human workers.

4. The computer-implemented process of claim 1 wherein the predictive worker model of one or more of the workers is automatically updated whenever any corresponding historical information regarding worker behavior relating to one or more recommended tasks is received.

5. The computer-implemented process of claim 1 wherein the evaluation for bundle construction and task recommendation further comprises a consideration of one or more of future contexts of one or more of the workers in the worker pool.

6. The computer-implemented process of claim 1 wherein each worker represents a bundle of two or more workers.

7. The computer-implemented process of claim 1 further comprising minimizing task pricing as a joint optimization with the maximization of the predicted task completion rate over the available tasks.

8. The computer-implemented process of claim 1 wherein one or more dry runs of the bundle construction and task recommendation are performed by varying one or more of the task contexts prior to actual task recommendation to workers to provide feedback to one or more of the task publishers for use in specifying one or more of the task contexts.

9. The computer-implemented process of claim 1 wherein current contexts of one or more users is used to recommend tasks to users that are predicted to be near a task location during a time in which a task is to be completed.

10. The computer-implemented process of claim 1 wherein real-time alerts are provided to workers when they are near a location of a recommended task.

11. A system for bundling tasks, comprising:
a general purpose computing device; and
a computer program comprising program modules executable by the computing device, wherein the computing device is directed by the program modules of the computer program to:
receive specifications for multiple different tasks, each task having a plurality of task contexts from one or more task publishers;
evaluate historical information regarding worker behavior relating to one or more previously assigned tasks to automatically learn a predictive worker model for each of a plurality of non-human virtual workers;
receive one or more current contexts and zero or more future contexts for each of the non-human virtual workers;
jointly evaluate all of the multiple different tasks, the task contexts, the worker models, and the current and future contexts for each of the workers to construct a plurality of optimized bundles of one or more of the multiple different tasks, the plurality of optimized bundles together including all of the multiple different tasks;
the joint evaluation further comprising formulating the combination of the multiple different tasks, the task contexts, the worker models, and the current contexts as a submodular and monotonic objective function and solving that objective function as a constrained optimization problem to compute a single predicted task completion rate that covers all of the multiple different tasks; and
automatically recommend the optimized bundles to particular non-human virtual workers, such that the single predicted task completion rate over all of the multiple different tasks is maximized by the bundle construction and task recommendation.

12. The system of claim 11 wherein the learned predictive model for one or more of the workers is updated in real-time whenever additional historical information corresponding to those workers is received.

13. The system of claim 11 further comprising:
receiving a separate machine-learned predictive worker model for each of a plurality of human workers in a worker pool; and
the joint evaluation further comprising a combination of non-human virtual workers and human workers.

14. The system of claim 11 wherein one or more dry runs of the bundle construction and task recommendation are performed by varying one or more of the task contexts prior to actual task recommendation to workers to provide feedback to one or more of the task publishers for use in specifying one or more of the task contexts.

15. The system of claim 11 further comprising minimizing task pricing as a joint optimization with the maximization of the predicted task completion rate over the available tasks.

16. A computer-readable storage device having computer executable instructions stored therein for recommending tasks, said instructions causing a computing device to execute a method comprising:
providing an interactive user interface for receiving specifications for multiple different tasks, each task having a plurality of task contexts;
automatically learning a predictive worker model for each of a plurality of non-human virtual workers from historical information regarding worker behavior relating to one or more previously assigned tasks;
evaluating sensor data to infer one or more worker contexts;
jointly evaluating all of the multiple different tasks, the task contexts, the predictive worker models, and the inferred worker contexts for each of the non-human virtual workers;
the joint evaluation further comprising formulating the combination of the multiple different tasks, the task contexts, the worker models, and the current contexts as a submodular and monotonic objective function and solving that objective function as a constrained optimization problem to compute a single predicted task completion rate that covers all of the multiple different tasks;
responsive to the joint evaluation, constructing a plurality of optimized bundles of one or more tasks, the plurality of optimized bundles together including all of the multiple different tasks; and
automatically recommending the optimized bundles to particular non-human virtual workers, such that the single predicted task completion rate over all of the multiple different tasks is maximized by the bundle construction and task recommendation.

17. The computer-readable storage device of claim 16 wherein constructing a plurality of optimized bundles further comprises using a greedy constraint-based optimization processes that considers the tasks, the task contexts, the predictive worker models, and the worker contexts to perform bundle optimization.

18. The computer-readable storage device of claim 16 wherein one or more dry runs of the bundle construction and task recommendation are performed by varying one or more of the task contexts prior to actual task recommendation to provide feedback for use in specifying one or more of the task contexts.

19. The computer-readable storage device of claim 16 further comprising minimizing task pricing as a joint optimization with the maximization of the predicted task completion rate over the available tasks.

20. The computer-readable storage device of claim 16 wherein the workers further comprise one or more human workers in addition to the one or more virtual workers.

* * * * *